Patented Oct. 6, 1936

2,056,161

UNITED STATES PATENT OFFICE 2,056,161

AROMATIC-HYDROCARBON MERCURY POLYNUCLEAR-CARBOXYLATES

Carl N. Andersen, Watertown, Mass., assignor to Lever Brothers Company, a corporation of Maine No Drawing. Application December 7, 1934, Serial No. 756,478

19 Claims. (Cl. 260—13)

The present invention relates to the production of certain new organic mercury compounds, and particularly to aromatic mercury salts of interconnected and condensed polynuclear mono and polybasic acids and their substituted derivatives.

It is an object of my invention to produce new organic mercury compounds useful as germicides and for other therapeutic purposes.

I have discovered that when the hydrogen atom of the carboxyl group of condensed or interconnected polynuclear acids is replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having the general formula $(RHg)_x.R_1$, in which R represents an aromatic structure, to a carbon atom of which the mercury is directly attached; in which $x$ represents an integer of one or more; and in which $R_1$ represents a radical corresponding to a condensed or interconnected polynuclear mono or polybasic acid and its substituted derivatives, which is linked to the RHg group through the replacement of the hydrogen atom of the carboxyl group. While the word "group" is used herein, it is to be understood as plural where the value of $x$ is more than one.

More particularly R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon, or mercury.

R may stand for the phenyl group $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The radical $R_1$ represents a radical corresponding to an interconnected polynuclear compound such as exemplified by the diphenyl group, or it represents a condensed nuclear compound such as exemplified by the naphthyl group, one or more of the hydrogen atoms of which are replaced by the COOH group to yield a corresponding mono or polybasic acid. The hydrogen atoms so replaced may be attached directly to one or several rings, or to an interconnecting carbon atom. Should one of the nuclei not be aromatic in structure, more than one hydrogen attached to the same carbon atom may be replaced by the carboxyl group. The above described acids may also have other hydrogen atoms replaced by other radicals such as, for example, the hydroxyl radical, to yield their corresponding substituted derivatives.

The following are examples illustrating types of acids falling within the above defined class and from which the aromatic mercury derivatives comprising my invention may be prepared:

Diphenic acid, COOH—$C_6H_4$—$C_6H_4$—COOH;
Benzilic acid, $(C_6H_5)_2C(OH)$—COOH;
Gallotannic acid,
    COOH(OH)$_2C_6H_2$—O—CO—$C_6H_2(OH)_3$;
3 hydroxy, 2-naphthoic acid,

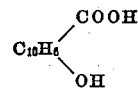

Alpha naphthoic acid, $C_{10}H_7$—COOH;
Naphthalic acid, $C_{10}H_6(COOH)_2$;
Triphenyl methane carboxylic acid
    $(C_6H_5)_2CH$—$C_6H_4COOH$;
Hydrindene di-carboxylic acid,

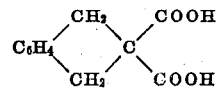

Phenylmercury derivative of alazarine yellow (Schultz (6th ed.) #66, "Colour Index" #40);
Phenylmercury derivative of rhodamine B (Schultz (6th ed.) #864, "Colour Index" #749);
Phenylmercury derivative of gallocyanine (Schultz (6th ed.) #998, "Colour Index" #883).

The last named compounds are dyes which are polynuclear acids. I find that their phenylmercury derivatives possess germicidal properties.

I have prepared the organic mercury salts corresponding to all of the above noted acids. These compounds, together with others I have investigated, comprise a sufficiently representative number of the condensed or interconnected polynuclear acids and their derivatives to lead me to believe that all of these acids can be employed to produce my novel mercury compounds. The compounds so prepared have, in greater or lesser, but always in relatively high degree, desirable antiseptic and germicidal properties. I therefore regard my invention as generic to and including the entire group of interconnected and condensed polynuclear acids and their derivatives.

The general method of producing these compounds consists in reacting together the polynuclear acid and a compound containing an aromatic mercury radical of the above mentioned type. A common solvent for both reacting components is employed. The compound resulting from the reaction is usually relatively insoluble as compared with the reacting components, and upon its precipitation may be filtered, washed and dried. In my application Serial No. 694,198, filed October 18, 1933, I have disclosed a general method of preparing aromatic mercury compounds of this type by reacting an acidic compound with an aromatic mercury hydroxide. This reaction is one of neutralization of an acid and base to form a salt and water. This has the advantage that water is the only other product produced and the resulting compound may be easily purified. In my application Serial No. 694,199, filed October 18, 1933, I have disclosed another general method of preparing aromatic mercury compounds of this type by employing a soluble aromatic mercury salt, for example, the acetate, in a reaction with the acidic compound. The aromatic mercury compounds produced are of a relatively low solubility as compared with the aromatic mercury salt and are relatively insoluble as compared with the acidic compound. Either of these general methods may be employed in producing the compounds comprising this invention. If no great excess of the aromatic mercury compound is employed, the connection between the nuclei will not be disturbed and the substituted radicals in the polynuclear compounds will remain intact. Only the acidic hydrogen will be replaced.

The following examples are given as illustrative of the method by which all the compounds of this group may be prepared and as illustrative of representative organic mercury derivatives falling within the scope of my invention.

*Example 1*

17.64 grams of phenylmercury hydroxide is dissolved in 4 liters of water and heated until solution is complete. The solution is filtered to remove any insoluble material. To the filtrate is added an aqueous solution of 7.99 grams of diphenic acid. The mixture is allowed to stand for twelve hours, during which time a precipitate separates. The mixture is filtered and the precipitate is washed with warm water, and dried at 110° C. It has a melting point of 110° to 120° C., and is the compound phenylmercury diphenate.

*Example 2*

8.82 grams of phenylmercury hydroxide is dissolved in 2 liters of water and heated until solution is complete. The solution is filtered to remove any gum or insoluble material. To the filtrate is added 7.52 grams of benzilic acid dissolved in 100 cc. alcohol and 400 cc. water. A white crystalline compound separates after the mixture has stood. The mixture is filtered and the precipitate is washed well with warm water and dried. It melts at 157–158° C. and is compound phenylmercury benzilate.

*Example 3*

20.16 grams of phenylmercury acetate is dissolved in 2 liters of water and heated until solution is complete. The solution is filtered to remove any insoluble material. To the filtrate is added an aqueous solution containing 21.25 grams of tannic acid. A pinkish precipitate results. The mixture is allowed to stand for twelve hours, after which it is filtered. The precipitate is washed and dried. It does not melt up to 250° C. and slowly decomposes over 150° C. It is the compound phenylmercury tannate.

*Example 4*

17.64 grams of phenylmercury hydroxide is dissolved in 4 liters of water and heated until solution is complete. The solution is filtered to remove any insoluble material. To the filtrate is added 13.76 grams of 3-hydroxy 2-naphthoic acid in aqueous solution. A precipitate results on mixing, and the mixture is allowed to cool, after which it is filtered. The precipitate is washed well with warm water and dried. It melts at 205–206° and decomposes at about 215° C., and is compound phenylmercury 3-hydroxy 2-naphthoate.

*Example 5*

17.64 grams of phenylmercury hydroxide is dissolved in 1 liter of water and heated until solution is complete. The solution is filtered to remove any insoluble material. To the filtrate is added an alcohol solution containing 11.35 grams of a-naphthoic acid. Upon boiling the mixture for a few minutes a reddish oil separates on the bottom. The supernated liquid is decanted and oil taken out in alcohol. Upon cooling the alcohol a red mixture consisting of white crystals and a red gum is formed. Several recrystallizations yield white shining crystals melting at 108.5–109° C. The compound is phenylmercury a-naphthoate.

*Example 6*

35.28 grams of phenylmercury hydroxide is dissolved in 4 liters of water and heated until solution is complete. The solution is filtered to remove any insoluble material. To the filtrate is added 14.25 grams of naphthalic acid dissolved in 400 cc. of alcohol. A yellowish curdly precipitate results. The mixture is allowed to stand, after which it is filtered and the precipitate washed and dried. It has a melting point of 181–184° C., and is compound phenylmercury naphthalate.

The reacting materials are employed in substantially theoretical quantities. In some cases, if desired, approximately 10% excess of the acid may be used in order to assure the complete conversion of the phenylmercury compound.

Any suitable solvent in which the reacting components are soluble may be used as the medium for carrying out the reaction. If they are both soluble in water this is generally used for reasons of convenience, but if not, other solvents, such as acetone or mixtures of these with each other, or with the alcohols or water may be employed. The process may be carried out at any temperature, for example, room temperature. In most cases I find, however, that the use of heat facilitates the solution of the reaction components and speeds the reaction.

From the description of the specific examples, it will be readily apparent to one skilled in the art how other members of the above identified group may be reacted with an aromatic mercury compound to produce the other mercury compounds of analogous structure which are within the scope of my invention. All of the compounds produced as above described are characterized by extraordinarily high potency as germicides. Tests to determine their efficacy in killing *B. typhosus* and *Staph. aureus* were carried on under the following conditions.

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. Special Method against *Staph. aureus* at 37° C.

As illustrative of the potency of the compounds, the killing power of the following compounds is given merely as illustrative.

The figures represent the maximum dilutions at which killing in 15 minutes resulted:

|  | B. typhosus | Staph. aureus |
|---|---|---|
| Phenylmercury diphenate (In alcohol) | 1:65,000 1:90,000 | 1:40,000 |
| Phenylmercury benzilate (In alcohol) | 1:38,000 1:80,000 | 1:25,000 |
| Phenylmercury 3-hydroxy 2-naphthoate (In alcohol) | 1:90,000 | 1:35,000 |
| Phenylmercury hydrindene dicarboxylate |  | 1:67,000 |

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic mercury compound of the general formula $(RHg)_x$—$R_1$, in which R represents an aromatic structure to a carbon atom of which the mercury is directly connected and in which none of the carbon atoms has direct linkage with any element other than hydrogen, carbon and mercury; in which $x$ is an integer having a value of at least one; and in which $R_1$ represents a polynuclear acid radical that is linked to the RHg group through the replacement of the hydrogen atom of the carboxyl group.

2. A new organic mercury compound of the general formula $(RHg)_x$—$R_1$, in which R represents an aromatic structure to a carbon atom of which the mercury is directly connected and in which none of the carbon atoms has direct linkage with any element other than hydrogen, carbon and mercury; in which $x$ is an integer having a value of at least one; and in which $R_1$ represents an interconnected polynuclear acid radical that is linked to the RHg group through the replacement of the hydrogen atom of the carboxyl group.

3. A new organic mercury compound of the general formula $(RHg)_x$—$R_1$, in which R represents an aromatic structure to a carbon atom of which the mercury is directly connected and in which none of the carbon atoms has direct linkage with any element other than hydrogen, carbon and mercury; in which $x$ is an integer having a value of at least one; and in which $R_1$ represents a condensed polynuclear acid radical that is linked to the RHg group through the replacement of the hydrogen atom of the carboxyl group.

4. A new organic mercury compound of the general formula $(RHg)_x$—$R_1$, in which R represents an aromatic structure to a carbon atom of which the mercury is directly attached and in which none of the carbon atoms has direct linkage with any element other than hydrogen, carbon and mercury; in which $x$ is an integer having a value of at least one; and in which $R_1$ represents a substituted polynuclear acid radical that is linked to the RHg group through the replacement of the hydrogen atom of a carboxyl group.

5. A new organic mercury compound of the general formula $(RHg)_x$—$R_1$, in which R represents an aromatic structure to a carbon atom of which the mercury is directly attached and in which none of the carbon atoms has direct linkage with any element other than hydrogen, carbon and mercury; in which $x$ is an integer having a value of at least one; and in which $R_1$ represents a substituted interconnected polynuclear acid radical that is linked to the RHg group through the replacement of the hydrogen atom of the carboxyl group.

6. A new organic compound of the general formula $(RHg)_2$—$R_1$, in which R represents an aromatic structure to a carbon atom of which the mercury is directly attached and in which none of the carbon atoms has direct linkage with any element other than hydrogen, carbon and mercury; and in which $R_1$ represents a polynuclear dibasic acid radical that is linked to the RHg groups through the replacement of the hydrogen atoms of the carboxyl groups.

7. A new organic compound of the general formula $(RHg)_2$—$R_1$, in which R represents an aromatic structure to a carbon atom of which the mercury is directly attached and in which none of the carbon atoms has direct linkage with any element other than hydrogen, carbon and mercury; and in which $R_1$ represents a condensed polynuclear dibasic acid radical that is linked to the RHg groups through the replacement of the hydrogen atoms of the carboxyl groups.

8. A new organic mercury compound of the general formula $RHg$—$R_1$ in which R represents an aromatic structure to a carbon atom of which the mercury is directly attached and in which none of the carbon atoms has direct linkage with any element other than hydrogen, carbon and mercury; and in which $R_1$ represents a condensed polynuclear monobasic acid radical that is linked to the RHg group through the replacement of the carboxyl hydrogen atom.

9. A new organic mercury compound of the general formula $RHg$—$R_1$ in which R represents an aromatic structure to a carbon atom of which the mercury is directly attached and in which none of the carbon atoms has direct linkage with any element other than hydrogen, carbon and mercury; and in which $R_1$ represents a substituted condensed polynuclear monobasic acid radical that is linked to the RHg group through the replacement of the carboxyl hydrogen atom.

10. A new organic compound of the general formula $(C_6H_5Hg)_x$—$R_1$, in which $x$ is an integer having a value of at least one; in which $R_1$ represents a polynuclear acid radical that is linked to the $C_6H_5Hg$ group through the replacement of the hydrogen atom of a carboxyl group.

11. A new organic mercury compound of the general formula $(C_6H_5Hg)_x$—$R_1$, in which $x$ is an integer having a value of at least one; in which $R_1$ represents a substituted polynuclear acid radical that is linked to the $C_6H_5Hg$ group through the replacement of the hydrogen atom of a carboxyl group.

12. A new organic mercury compound of a general formula $(C_6H_5Hg)_x$—$R_1$, in which $x$ is an integer having a value of at least one; in which $R_1$ represents a substituted interconnected polynuclear acid radical that is linked to the $C_6H_5Hg$ group through the replacement of the hydrogen atom of the carboxyl group.

13. A new organic compound of the general formula $(C_6H_5Hg)_2$—$R_1$, in which $R_1$ represents a polynuclear dibasic acid radical that is linked to the $C_6H_5Hg$ groups through the replacement of the hydrogen atoms of the carboxyl groups.

14. A new organic mercury compound of the general formula $(C_6H_5Hg)_2$—$R_1$, in which $R_1$ represents a condensed polynuclear dibasic acid radical that is linked to the $C_6H_5Hg$ group through the replacement of the hydrogen atoms of the carboxyl groups.

15. A new organic mercury compound of the general formula $C_6H_5Hg$—$R_1$, in which $R_1$ represents a polynuclear monobasic acid radical that is linked to the $C_6H_5Hg$ group through the replacement of the carboxyl hydrogen atom.

16. A new organic mercury compound of the general formula $C_6H_5Hg)$—$R_1$, in which $R_1$ represents a condensed polynuclear monobasic acid radical that is linked to the $C_6H_5Hg$ group through the replacement of the carboxyl hydrogen atom.

17. Phenylmercury tannate.
18. Phenylmercury alpha naphthoate.
19. Phenylmercury naphthalate.

CARL N. ANDERSEN.